Figure 3:
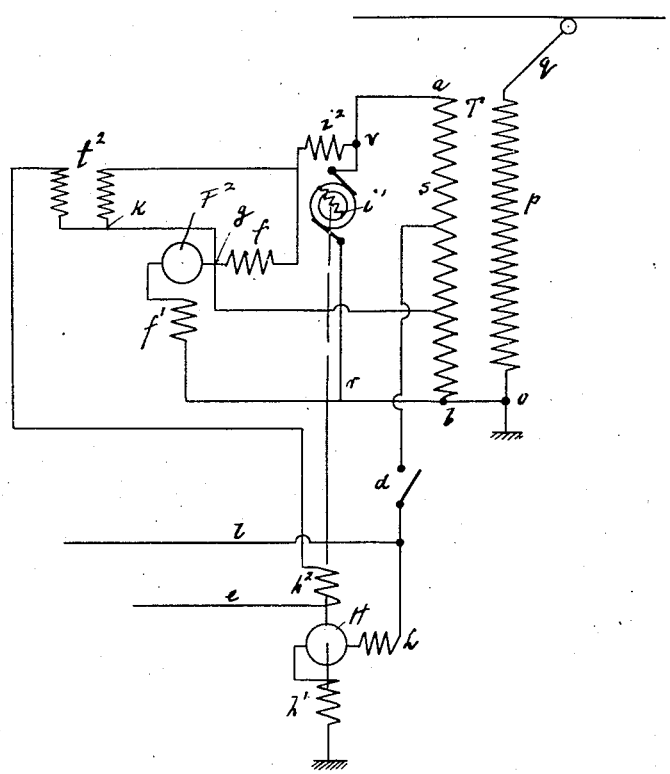

R. RICHTER.
MULTIPLE CONTROL OF ELECTRIC MOTORS.
APPLICATION FILED APR. 9, 1912.
1,080,587.
Patented Dec. 9, 1913.
2 SHEETS—SHEET 1.
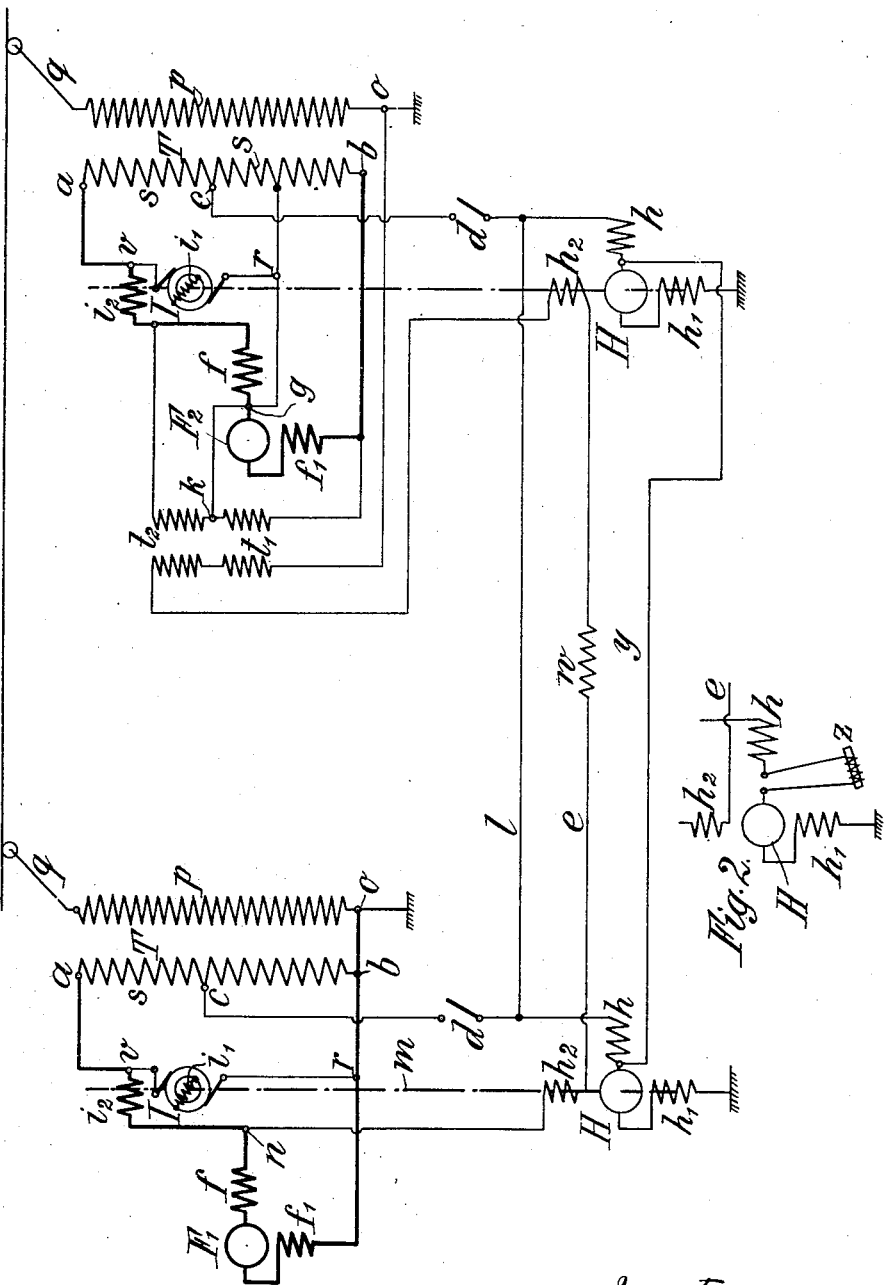
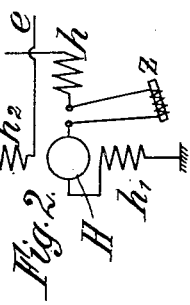

R. RICHTER.
MULTIPLE CONTROL OF ELECTRIC MOTORS.
APPLICATION FILED APR. 9, 1912.

1,080,587.

Patented Dec. 9, 1913.

Witnesses:
C. S. Ashley
J. J. Donohue

Inventor
Rudolf Richter
By his Attorney
Max F. Ordmann

UNITED STATES PATENT OFFICE.

RUDOLF RICHTER, OF GRÜNAU, GERMANY, ASSIGNOR TO MAFFEI-SCHWARTZKOPFF WERKE G. M. B. H., OF BERLIN, GERMANY.

MULTIPLE CONTROL OF ELECTRIC MOTORS.

1,080,587.      Specification of Letters Patent.      Patented Dec. 9, 1913.

Application filed April 9, 1912. Serial No. 689,589.

*To all whom it may concern:*

Be it known that I, RUDOLF RICHTER, a subject of the German Emperor, residing at Grünau, Mark, Germany, have invented new and useful Improvements in Multiple Control for Electric Motors, of which the following is a specification.

When separately fed electric motors, for example, the motors of several independent motor-driven vehicles of electric railways, are to be controlled from one point, it is generally necessary to provide means for insuring, that the single motors are loaded according to their outputs.

Such an arrangement, which is of particularly simple character, when there are only two motors to be controlled forms the subject matter of the present invention. According to this arrangement corresponding winding parts of the motors to be controlled are connected with each other by means of compensation leads, in such a manner, that the current in these compensation leads is at zero, when the motors are loaded according to this output; this means that the motors as generally used in practice are made uniform for then the same will when loaded allow the same output. Every difference in the absorption of power will then cause a flow of current through the connecting leads, which current will influence the controlling members, relays and auxiliary motors in such a manner, that they will again restore the equality of the load on the motors.

In the present application under the term "corresponding" winding parts of the different motors is meant such winding parts the potentials of which are substantially the same function of the power supplied to the respective main motors or are approximately proportionate to the output, or such windings which vary according to the same law as that under which the absorption of power varies. In general winding parts with proportional potentials will come into question. The most simple case is that, where the total windings of the individual motors can be utilized, as for instance with motors of the same type and size.

In the accompanying drawing a constructional form of the invention is exemplified.

Figure 1 shows the general arrangement in a diagrammatic form, while Figs. 2 and 3 are modified arrangements of a part of the diagram.

On the left hand in Fig. 1 is shown an ordinary series motor $F^1$ as driving motor, on the right hand side a motor $F^2$ fed from two sources, for illustrating the application of the invention to different types of driving motors. The energy is supplied to the motors through the transformers T, which again are fed from the feeder line by means of collectors $q$. The other ends of the primary windings $p$ of the transformers are grounded. The leads connecting to the driving motors $F^1$ or $F^2$ respectively are branched off at $a$ and $b$ respectively from the secondary windings $s$ of the transformers and marked in the drawing by heavy lines. They comprise besides the driving motors the secondary winding $i^2$ of an induction regulator or rotary transformer I, which serves to regulate the electromotive force supplied to the driving motor. This is done in the known manner by turning the primary winding $i^1$ of the induction regulator, which is connected at $v$ and $r$ to the secondary winding of the transformer T. The rotation of the induction regulator is effected by means of a transmission gearing, indicated in the drawing by the reference letter $m$, from an auxiliary motor H. The auxiliary motors have the form of ordinary series motors, being, however, provided with additional field windings $h^2$, which connect in the constructional form shown on the left hand side of the drawing, at $n$ with the driving motor $F^1$, in the other constructional form with the secondary windings of two auxiliary transformers $t^1$, $t^2$, connected in series. The total of the electromotive forces of these secondary windings, the other ends of which are grounded at $o$, represents the total electromotive force of the motor $F^2$, fed from two sources, which force corresponds to that of the series motor $F'$, in other words the series connected secondary windings are the windings of the motor $F^2$ fed from two sources, which total windings "correspond" to the total windings of the motor $F'$, the direct connection to the windings of the motor $F^2$ not being possible, owing to the fact that the number of turns in the stator and that in the rotor are not the same.

The primary sides of the auxiliary transformers $t^1$ and $t^2$, the transformation ratio of which corresponds to the electromotive force of the motor $F^1$, are connected to the field and the working windings respectively of the motor $F^2$ and connected in series. The point of connection $k$ is connected with the point of connection $g$ for the compensating lead to the transformer T. The electromotive force at the auxiliary transformer $t^2$, which is constant, may also be taken from the secondary winding $s$ of the main transformer T, (Fig. 3) in which case only one auxiliary transformer $t^2$ is required. In Fig. 3 the same reference characters are used to denote the same parts as in Fig. 1. It will be seen that the arrangement is practically the same as in Fig. 1 excepting that the auxiliary transformer $t^1$ and the leads corresponding thereto are dispensed with. The other ends of the auxiliary windings $h^2$ are connected with each other by means of lead $e$. The compensating circuit according to the present invention is formed by the lead proceeding from the point $o$ of the transformer T on the right hand side over the secondary side of the auxiliary transformers $t^1$, $t^2$ and containing the additional field winding $h^2$ of the auxiliary motor H on the right, farther extending through the connection lead $e$, the winding $h^2$ of the left auxiliary motor and continuing over point $n$ and the motor $F^1$ to $o$, and closed by the grounding between the points $o$, $o$. The connections of the additional windings $h^2$, $h^2$ are such that a compensating current, which will weaken the field of the one auxiliary motor, will correspondingly increase the field of the other.

When the motors $F^1$ and $F^2$ are to be started, one of the switches $d$ at the driver's stands, which are connected by means of a lead $l$, is closed; the other remains open. The auxiliary motors H will then start and turn the induction regulator I so that the total electromotive force supplied to the motor is increased. As soon as this increase takes place for some reason or other, more rapidly at one of the motors, than at the other, a compensating current flows through the windings $h^2$ and strengthens the field of the corresponding control motor H, whereby the speed of this motor is diminished, so that the increase of the electromotive force at the respective main motor is slowed down. The field of the other control motor on the other hand is weakened, and its speed is accordingly increased, the electromotive force supplied to the corresponding main motor will therefore rise more rapidly. The smallest differences in the power absorption of the main motors $F^1$ and $F^2$ are thus immediately compensated by a suitable actuation of the control motors.

The corrective working of the compensation currents take place the more promptly, the better the phase agreement between the armature current in the control motor. For improving such agreement it is advisable to insert ohmic resistances $w$, Fig. 1, in the compensation circuit or inductive resistances $z$, Fig. 2, in the armature circuit of the control motor. For insuring an approximately synchronous running of the auxiliary motors even while the additional field winding is unexcited, it is further advisable to provide compensating connections between the armature winding and the main field winding of the control motors H so that the armature electromotive forces on the other hand are all equal to each other. The additional field windings $h^2$ are preferably so arranged, that they are not magnetically interlinked with the main field windings. They may also be replaced by series transformers, the primary windings of which are traversed by the compensation current and the secondary windings of which are connected in series with the main field windings of the control motors.

What I claim is:

1. In combination with a system for control of separately fed electric motors from one place, means for individually regulating the voltage of said motors, auxiliary motors for actuating said regulating means, compensating leads connecting the windings of said auxiliary motors to corresponding winding parts of the different main motors, the connection of said compensating leads to the windings of said auxiliary motors being such as to cause the currents flowing in said leads to strengthen the fields of said auxiliary motors for those motors absorbing too much power and to weaken the fields of the other auxiliary motors.

2. In combination with a system for the control of separately fed electric motors from one place, means for individually regulating the voltage of said motors, auxiliary motors for actuating said regulating means, compensating leads connecting the windings of said auxiliary motors to corresponding winding parts of the different main motors, the connection of said compensating leads to the windings of said auxiliary motors being such as to cause the currents flowing in said leads to strengthen the fields of said auxiliary motors for those motors absorbing too much power and to weaken the fields of the other auxiliary motors, and transformers inserted in said compensating leads.

3. In combination with an alternating current traction system of the type having a main transformer on each locomotive along with a rotary additional transformer as voltage regulator for the driving motor, auxiliary motors for driving said rotary transformers, additional field windings in said auxiliary motors, compensating leads containing said additional field windings and corresponding winding parts of the individual main motors, the connection of said compensating leads to said additional windings being such as to cause the currents flowing in said leads to strengthen the fields of said auxiliary motors for those motors absorbing too much power and to weaken the fields of the other auxiliary motors, switches on each locomotive for supplying said auxiliary motors from the secondaries of said main transformers, and leads connecting said switches to each other.

4. In combination with an alternating current traction system of the type having a main transformer on each locomotive along with a rotary additional transformer as voltage regulator for the driving motor, auxiliary motors for driving said rotary transformers, additional field windings in said auxiliary motors, compensating leads containing said additional field windings and corresponding winding parts of the individual main motors, the connection of said compensating leads to said additional windings being such as to cause the currents flowing in said leads to strengthen the fields of said auxiliary motors for those motors absorbing too much power and to weaken the fields of the other auxiliary motors, switches on each locomotive for supplying said auxiliary motors from the secondaries of said main transformers, leads connecting said switches to each other, and ohmic resistances inserted in said compensating leads in addition to said additional field windings.

5. In combination with an alternating current traction system of the type having a main transformer on each locomotive along with a rotary additional transformer as voltage regulator for the driving motor, auxiliary motors for driving said rotary transformers, additional field windings in said auxiliary motors, compensating leads containing said additional field windings and corresponding winding parts of the individual main motors, the connection of said compensating leads to said additional windings being such as to cause the currents flowing in said leads to strengthen the fields of said auxiliary motors for those motors absorbing too much power and to weaken the fields of the other auxiliary motors, switches on each locomotive for supplying said auxiliary motors from the secondaries of said main transformers, leads connecting said switches to each other, and inductive resistances in the armature circuits of said auxiliary motors.

6. In combination with an alternating current traction system of the type having a main transformer on each locomotive along with a rotary additional transformer as voltage regulator for the driving motor, auxiliary motors for driving said rotary transformers, additional field windings in said auxiliary motors, compensating leads containing said additional field windings and corresponding winding parts of the individual main motors, the connection of said compensating leads to said additional windings being such as to cause the currents flowing in said leads to strengthen the fields of said auxiliary motors for those motors absorbing too much power and to weaken the fields of the other auxiliary motors, switches on each locomotive for supplying said auxiliary motors from the secondaries of said main transformers, leads connecting said switches to each other, ohmic resistances inserted in said compensating leads in addition to said additional field windings, and compensating connections between the points of connection of the armature windings and main field windings of said auxiliary motors.

7. In combination with an alternating current traction system of the type having a main transformer on each locomotive along with a rotary additional transformer as voltage regulator for the driving motor, auxiliary motors for driving said rotary transformers, additional field windings in said auxiliary motors, compensating leads containing said additional field windings and the windings of the main motors, the connection of said compensating leads to said additional windings being such as to cause the currents flowing in said leads to strengthen the fields of said auxiliary motors for those motors absorbing too much power and to weaken the fields of the other auxiliary motors, switches on each locomotive for supplying said auxiliary motors from the secondaries of said main transformers, and leads connecting said switches to each other.

8. In combination with an alternating current traction system of the type having a main transformer on each locomotive along with a rotary additional transformer as voltage regulator for the driving motor, auxiliary motors for driving said rotary transformers, additional field windings in said auxiliary motors, compensating leads containing said additional field windings and the windings of the main motors, the connection of said compensating leads to said additional windings being such as to cause the currents flowing in said leads to strengthen the fields of said auxiliary motors for those motors absorbing too much power and to weaken the fields of the other auxiliary motors, switches on each locomotive for supplying said auxiliary motors from the secondaries of said main transformers, leads connecting said switches to each other and compensating connections between the points of connection of the armature windings and main field windings of said auxiliary motors.

In testimony whereof I have signed my name to this specification in the presence of two subscribing witnesses.

RUDOLF RICHTER.

Witnesses:
   HENRY HASPER,
   WOLDEMAR HAUPT.